United States Patent [19]

Vaidya et al.

[11] Patent Number: 5,764,036

[45] Date of Patent: Jun. 9, 1998

[54] MULTIPLE OUTPUT DECOUPLED SYNCHRONOUS GENERATOR AND ELECTRICAL SYSTEM EMPLOYING SAME

[75] Inventors: Jayant G. Vaidya; Madan L. Bansal; Hassan Mansir, all of Rockford, Ill.

[73] Assignee: Sundstrand Corporation, Rockford, Ill.

[21] Appl. No.: 400,894

[22] Filed: Mar. 8, 1995

[51] Int. Cl.$^6$ ........................................................ H02P 9/00
[52] U.S. Cl. ........................... 322/90; 322/62; 322/63; 310/149; 310/150; 310/184; 310/185
[58] Field of Search ........................ 322/49, 58, 62, 322/90; 310/111, 112, 198, 170

[56] References Cited

U.S. PATENT DOCUMENTS

| | | | |
|---|---|---|---|
| 3,267,353 | 8/1966 | Franklin | 322/90 |
| 3,768,002 | 10/1973 | Drexler et al. | 322/25 |
| 3,793,544 | 2/1974 | Baumgartner et al. | 320/17 |
| 4,045,718 | 8/1977 | Gray | 320/17 |
| 4,156,172 | 5/1979 | Hucker et al. | 322/68 |
| 4,743,777 | 5/1988 | Shilling et al. | 290/46 |
| 4,904,841 | 2/1990 | English | 219/133 |
| 5,233,286 | 8/1993 | Rozman et al. | 322/90 |
| 5,281,905 | 1/1994 | Dhyanchand et al. | 322/32 |
| 5,391,975 | 2/1995 | Okubo | 322/28 |

OTHER PUBLICATIONS

*Six Phase Synchronous Machine with AC and DC Stator Connections* Part 1, R.F. Schiferl, C.M. Ong, IEEE Transactions on Power Apparatus and Systems, vol. 102, No. 8, Aug. 1983.

*d–q Analysis of a Variable Frequency Speed Doubly AC excited Reluctance Motor* Feng Liang, Longya Xu and T.A. Lipo, Electric Machines and Power Systems, 19, pp. 125–138—1991.

Primary Examiner—Steven L. Stephan
Assistant Examiner—Nicholas Ponomarenko
Attorney, Agent, or Firm—Jeffery J. Makeever

[57] ABSTRACT

A multiple output synchronous generator in accordance with the instant invention comprises a stator having a first stator winding having a number of poles p and a second stator winding having a number of poles 2*p*n where p and n are any whole numbers, the first and second stator windings being wound utilizing a 60° phase belt winding configuration such that the first stator winding is magnetically decoupled from the second stator winding preventing interaction therebetween. The generator additionally comprises a rotor rotatably disposed within the stator defining an airgap therebetween. The rotor has a first field winding of a first polarity and a second field winding having a second number of windings wound thereon for generating a flux across the airgap such that the flux induces a voltage in the first and second stator windings. These first and second field windings are configured such that the flux generated in the airgap comprises a fundamental component and an even harmonic component of substantially equal magnitude. The winding configuration of the stator and rotor insure that only the fundamental flux component and odd harmonics induce a voltage in the first stator winding, and only the even harmonic component and even harmonics induce a voltage in the second stator winding. The magnetic decoupling of the first and second stator windings ensures that harmonic distortion induced in the second output by external equipment powered thereby is not reflected in the first output, thereby maintaining a "clean-bus" for use by utilization equipment sensitive to such distortion.

24 Claims, 10 Drawing Sheets

FULL PITCH WINDING — INTEGRAL SLOT/POLE/PHASE CONFIG

ABC – 2/3 PITCH

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| | -y | z | -x | y | -z | x | -y | z | x | y | -z | x | -y | z | -x | y | -z | x | -y | z | -x | y | -z | x |
| | -y | z | -x | y | -z | x | -y | z | -x | y | -z | x | -y | z | -x | y | -z | x | -y | z | -x | y | -z | x |
| | a | a | -b | c | c | -a | a | a | -b | -b | c | c | -a | a | a | -b | -b | c | c | -a | -a | a | a | -b |
| | -b | c | c | -a | -a | a | a | -b | -b | c | c | -a | -a | a | a | -b | -b | c | c | -a | -a | a | a | -b |

FIG.8d

36 SLOTS FULL PITCH

| SLOTS | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| XYZ | x | x | -y | -y | z | x | y | y | -z | x | x | -y | z | z | -x | y | y | -z |
| | x | -y | -y | z | -x | -x | y | -z | -z | x | -y | -y | z | -x | -x | y | -z | -z |
| ABC | a | a | a | -b | -b | -b | c | c | c | -a | -a | -a | b | b | b | -c | -c | -c |
| | a | a | -b | -b | -b | c | c | c | -a | -a | -a | b | b | b | -c | -c | -c | c |

| SLOTS | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|
| XYZ | x | x | -y | -y | z | x | y | y | -z | x | x | -y | z | z | -x | y | y | -z |
| | x | -y | -y | z | -x | -x | y | -z | -z | x | -y | -y | z | -x | -x | y | -z | -z |
| ABC | a | a | a | -b | -b | -b | c | c | c | -a | -a | -a | b | b | b | -c | -c | -c |
| | a | a | -b | -b | -b | c | c | c | -a | -a | -a | b | b | b | -c | -c | -c | c |

36 SLOTS - 2/3 PITCH ON THE 4 POLE

| SLOTS | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| XYZ | x | x | -y | z | z | -x | y | y | -z | x | x | -y | z | z | -x | y | y | -z |
|  | x | -y | -y | z | -x | -x | y | -z | -z | x | -y | -y | z | -x | -x | y | -z | -z |
| ABC | a | a | a | -b | -b | -b | c | c | c | -a | -a | -a | b | b | b | -c | -c | -c |
|  | -b | -b | -b | c | c | c | -a | -a | -a | b | b | b | -c | -c | -c | a | a | a |

| SLOTS | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|
| XYZ | x | x | -y | z | z | -x | y | y | -z | x | x | -y | z | z | -x | y | y | -z |
|  | x | -y | -y | z | -x | -x | y | -z | -z | x | -y | -y | z | -x | -x | y | -z | -z |
| ABC | a | a | a | -b | -b | -b | c | c | c | -a | -a | -a | b | b | b | -c | -c | -c |
|  | -b | -b | -b | c | c | c | -a | -a | -a | b | b | b | -c | -c | -c | a | a | a | form
MULTIPLE OUTPUT DECOUPLED SYNCHRONOUS GENERATOR AND ELECTRICAL SYSTEM EMPLOYING SAME

FIELD OF THE INVENTION

The instant invention relates to hybrid electric power generating systems, and more particularly to a multiple output, decoupled synchronous generator providing variable frequency regulated AC and rectified DC power outputs from separate armature windings.

BACKGROUND ART

As the size and complexity of modern aircraft continue to increase, so to the complexity and power demands of the utilization equipment installed therein. Conventional electrical power generating systems typically supply constant frequency AC power to all of the main distribution buses for use by various loads, and rely on separate downstream regulated or unregulated transformer/rectifier units (TRUs) to convert a portion of this power to DC for use by certain other loads. Since the generators which produce the constant frequency AC power are typically driven by the aircraft engines, which may be rotating a various speeds depending on the particular portion of the flight leg, hydromechanical conversion of the variable engine speed to a constant speed to drive the generator or electronic frequency conversion of the generator output power itself is required to maintain a constant output frequency. These conversion apparatuses, along with the downstream TRUs, add weight and complexity to the aircraft, but have been necessary to supply the utilization equipment with the constant frequency AC, and DC power they demand.

Future power systems, however, are characterized by an increased amount of loads utilizing active power electronics for their power inputs. This requires a substantial amount of filtering on the electrical system to remove harmonics induced by these loads to meet present power quality requirements. To minimize this trend's impact on the electrical power generating system, aircraft manufacturers are looking to generation and distribution architectures which will allow segregated loads to be supplied by variable frequency (VF) power as illustrated in FIG. 1. However, with the perspective of low, or no, bleed air from future aircraft engines, more electrical power will be required to power loads such as the environmental control system (ECS), which will increase still further the non-linear loads' percentage of the total installed load. This will impact the electrical generating system power quality still further. Maintaining VF power quality at the same level as the current constant frequency (CF) systems will lead to increased size, weight, and cost, and lower reliability for any filtering technique utilized, whether active or passive.

One of the architectures that is being considered for new electric power generating systems for future more electric airplanes (MEAs) is the dual "Clean-bus"/"Dirty-bus" architecture as shown in FIG. 2. The "clean-bus" is a voltage regulated variable frequency bus targeted for power quality sensitive loads. The "dirty-bus", on the other hand, is a nonregulated bus providing power to the non-linear load(s) on the system. The "dirty-bus" can be either dedicated to a single load or can provide power to a series of compatible loads. The conventional single output generator is not very compatible with this bus architecture because it requires substantial amounts of filtering to meet power quality requirements similar to constant frequency systems on the "clean-bus" due to the induced harmonics from the nonlinear loads.

To reduce the amount of filtering, a conventional dual output generator with a split armature, such as described by R.F. Schiferl in "Six Phase Synchronous Machine with AC and DC Stator Connections" IEEE Transactions on Power Apparatus and Systems, Vol. 102, No. 8, August 1983, can be used. The two outputs of this conventional generator are magnetically coupled because they share the same fundamental flux. This configuration, however, still requires substantial filtering to remove the harmonics induced on the "clean-bus" winding from the active electronic rectification of the "dirty-bus" winding's output because of the magnetic coupling therebetween. Furthermore, with a single control loop on the "Clean-bus", the "dirty-bus" voltage range is much wider which then requires the utilization equipment to provide appropriate compensation, leading to increased cost and complexity downstream of the electrical system.

The instant invention is directed at overcoming one or more of the above problems present in these conventional modern systems.

SUMMARY OF THE INVENTION

It is a principle objective of the instant invention to provide a new and improved dual output/dual frequency generator. More specifically it is the object of the instant invention to provide a dual output/dual frequency which will exhibit characteristics useful for a dual-bus architecture to reduce or eliminate filtering requirements.

In a preferred embodiment of the instant invention, the multiple output synchronous generator comprises a stator having a first and a second stator winding wound thereon utilizing a pattern such that the first stator winding is magnetically decoupled from the second stator winding preventing interaction therebetween. The first stator winding has a first number of poles p and the second stator winding has a second number of poles 2*p*n, where p and n are whole numbers. In a preferred embodiment the first stator winding has 4 poles and the second has 8 poles. The rotor, which is rotatably disposed within the stator, defines an airgap between its outer periphery and the stator. The rotor has a first and a second field winding wound thereon for generating a flux across this airgap such that it induces a voltage in the first and second stator windings.

In a highly preferred embodiment of the instant invention, the winding pattern of the stator windings is a 60° phase belt winding configuration. The first and said second field windings of the rotor are configured such that the flux generated in the airgap comprises a fundamental component and a first even harmonic component of substantially equal magnitude. Based on the relationship of the pole number and the first stator winding configuration, only the fundamental flux component and the odd harmonics induce a voltage in the first stator winding. This same relationship ensures that only even harmonic component and even harmonics induce a voltage in the second stator winding.

In a preferred embodiment of the instant invention, the first field winding and the second field winding are energized by a single source of electrical energy controlled by a controller to regulate the first generator output. Alternatively, the first field winding and the second field winding are energized by independent sources of electrical energy. The regulation of these sources of electrical energy may be controlled by a single or multiple controllers and allow for independent regulation of the output of the first and the second stator windings.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

FIG. 8a illustrates the winding configuration of a 24 slot armature in accordance with an embodiment of the instant invention;

FIG. 8b illustrates the winding configuration of a 24 slot armature having the abc winding pitched one slot; FIG. 8c illustrates the winding configuration of a 24 slot armature having an integral slot/pole/phase full pitch winding configuration;

FIG. 8d illustrates the winding configuration of a 24 slot armature having an abc ⅔ pitch winding configuration;

FIG. 8e illustrates the winding configuration of a 36 slot armature having a full pitch winding configuration;

FIG. 8f illustrates the winding configuration of a 36 slot armature having a ⅔ pitch on the 4 pole stator winding configuration.

DESCRIPTION OF THE PREFERRED EMBODIMENTS

Figure 1:
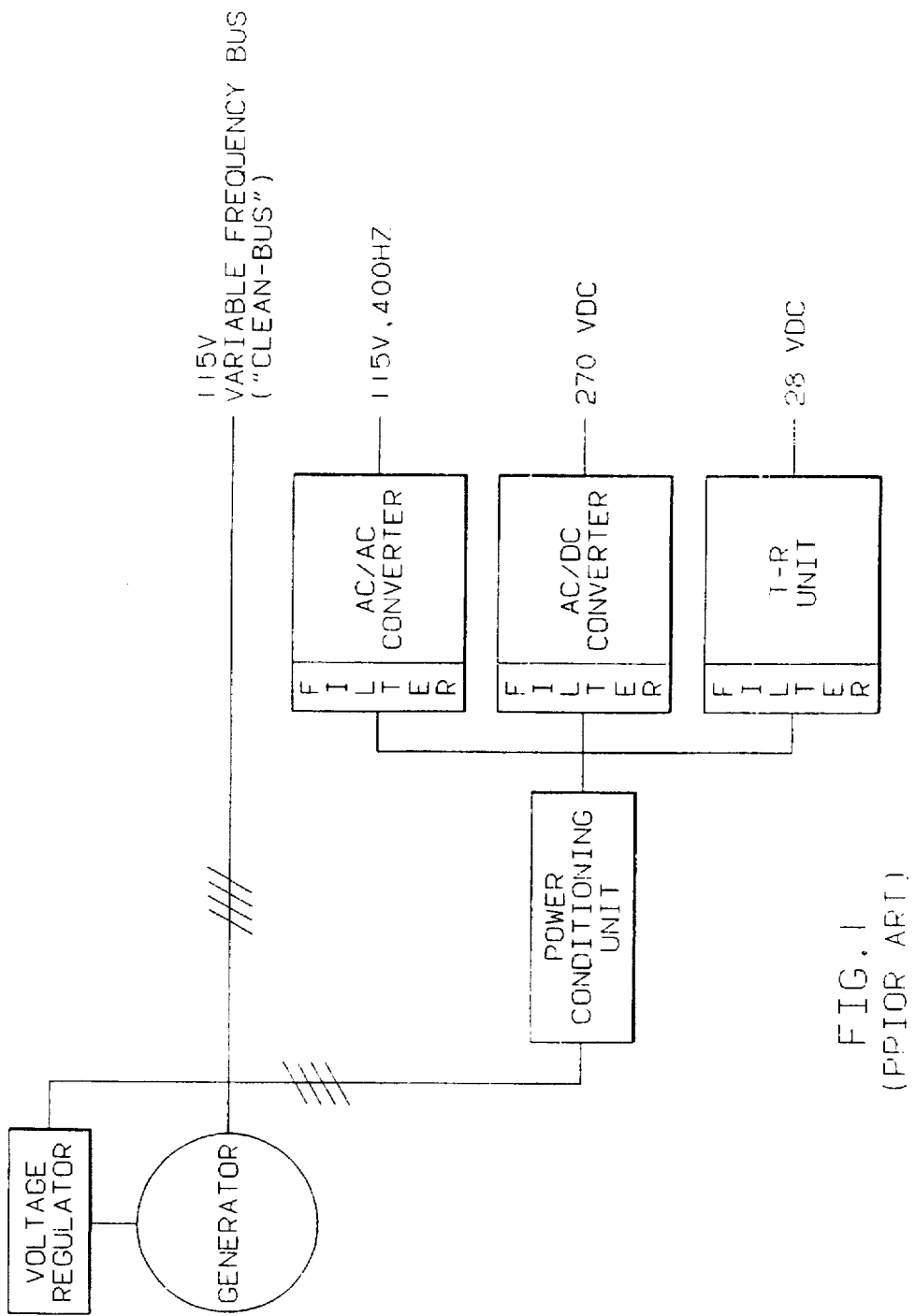
FIG. 1 is a single line diagram illustrating a hybrid system architecture using a conventional single output generator.
Figure 2:
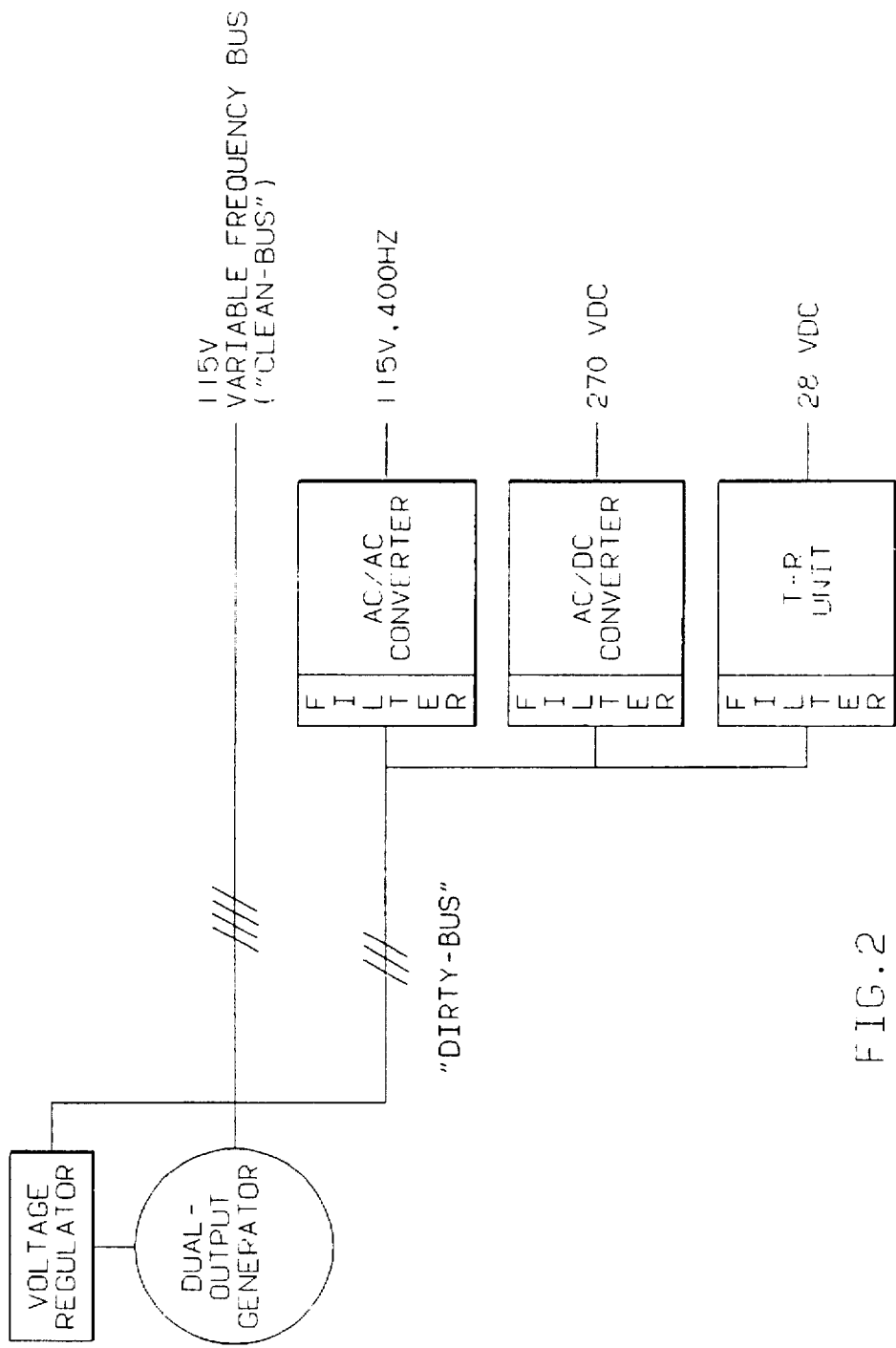
FIG. 2 is a single line diagram illustrating a hybrid system architecture using a dual output generator.
Figure 3:
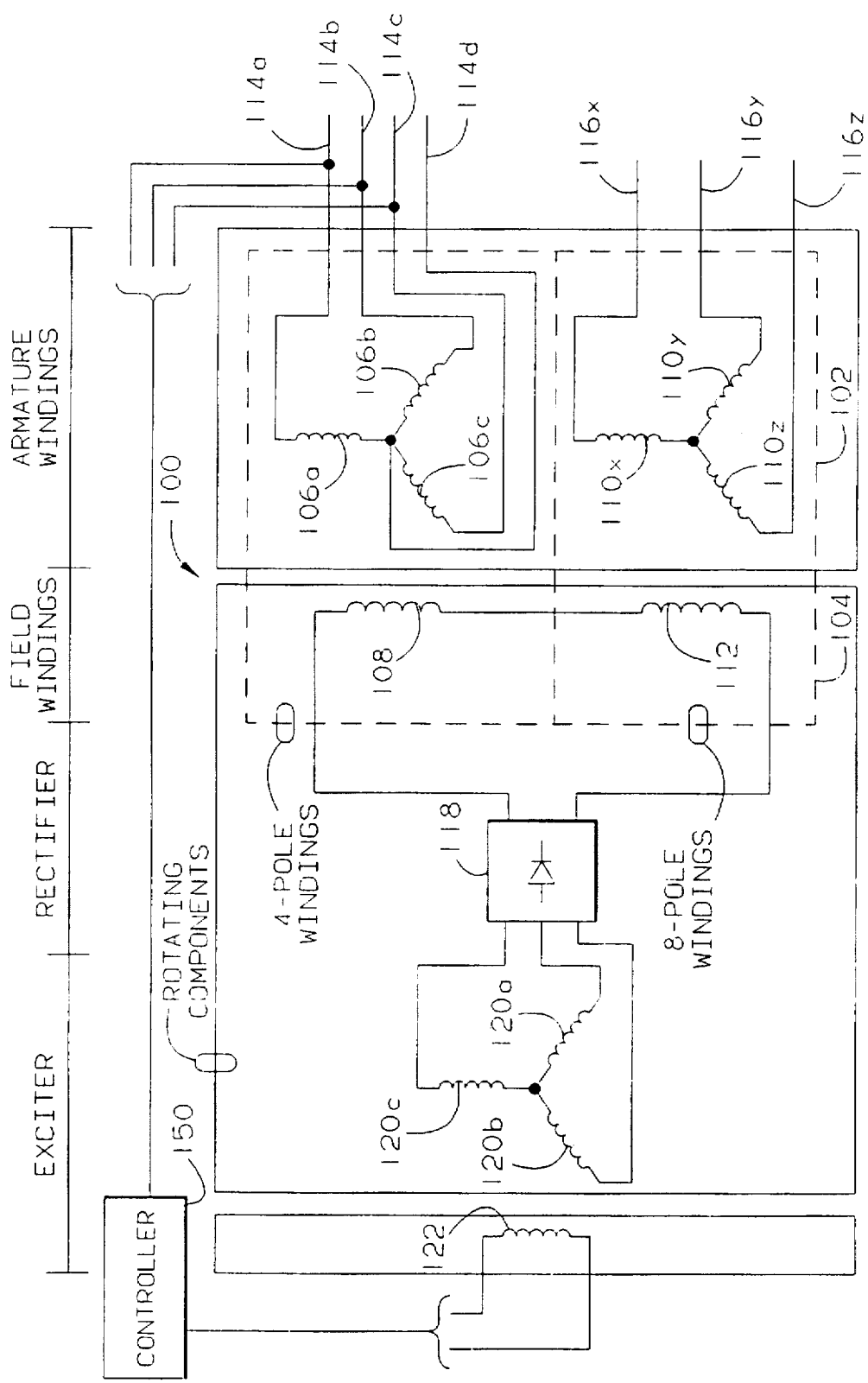
FIG. 3 is a block diagram illustrating an embodiment of the dual output/dual frequency generator of the instant invention.

In a preferred embodiment of the instant invention, as illustrated in FIG. 3, the dual output/dual frequency generator 100 comprises an armature 102 and a main field 104 having 2 sets of windings 106a–c and 108, and 110x–z and 112, with a different number of poles. The two sets of main field windings 108 and 112 are supplied from the same source of DC current, as illustrated in FIG. 3, a rotating rectifier 118 which rectifies the output from the rotating exciter armature windings 120a–c when the exciter field winding 122 is energized. This section of the generator 100 is illustrated as being separate only because its specific structure is not important to the preferred embodiment of the instant invention. Other structures which provide DC current for excitation of the two main field windings 106a–c and 110x–z are applicable as may be appropriate.

Figure 4:
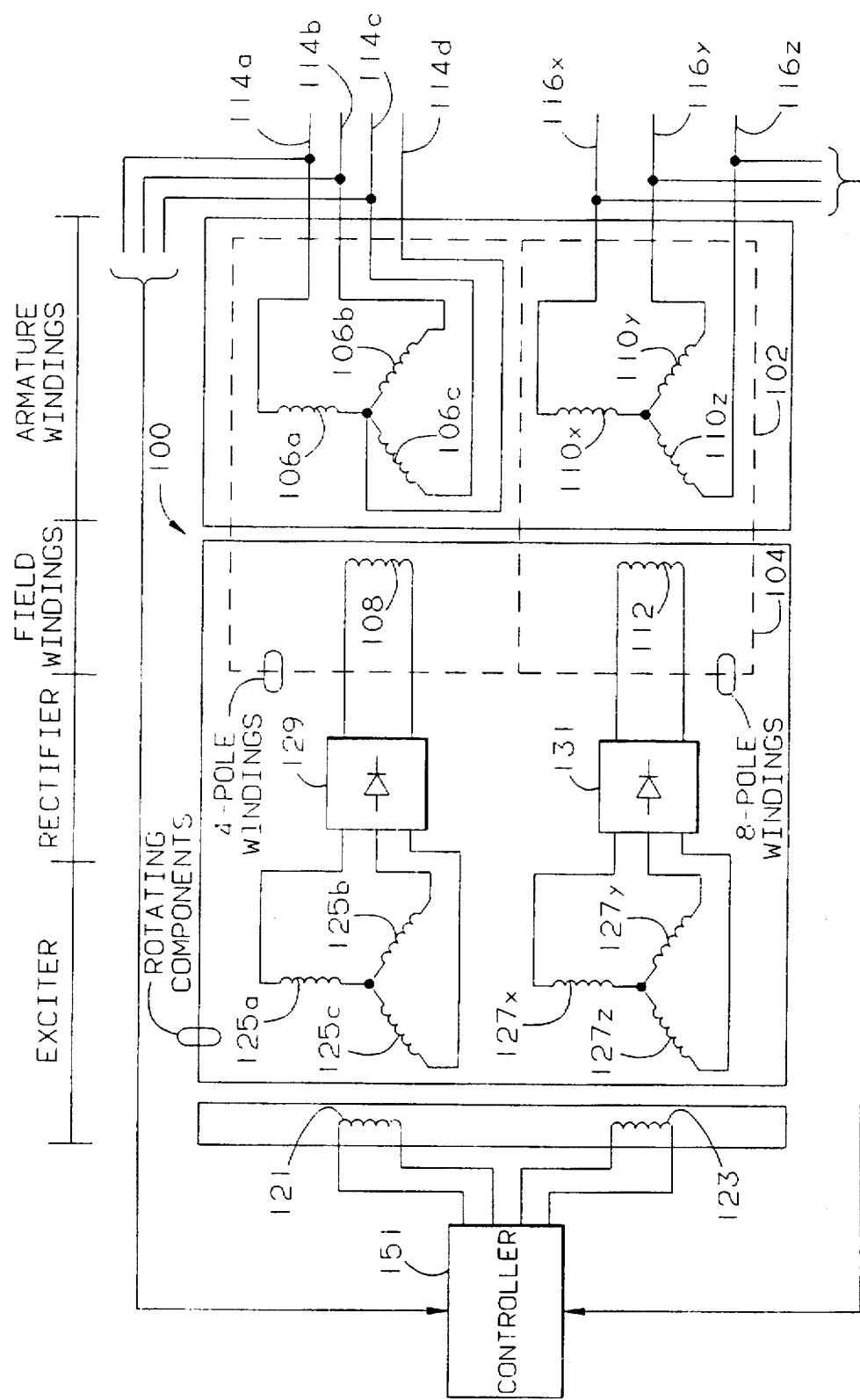
FIG. 4 is a block diagram illustrating an alternate embodiment of the dual output/dual frequency generator of the instant invention.

In an alternate embodiment of the instant invention, as illustrated in FIG. 4, the dual output/dual frequency generator 100 comprises an armature 102 and a main field 104 having 2 sets of windings 106a–c and 108, and 110x–z and 112, with a different number of poles. The two sets of main field windings 108 and 112 are supplied from different sources of DC current, as illustrated in FIG. 4. The first source comprises a rotating rectifier 129 which rectifies the output from the rotating exciter armature windings 125a–c when the exciter field winding 121 is energized. The second source comprises a rotating rectifier 131 which rectifies the output from the rotating exciter armature windings 127a–c when the exciter field winding 123 is energized. This section of the generator 100 is illustrated as being separate only because its specific structure is not important to the preferred embodiment of the instant invention. Other structures which provide DC current for excitation of the two main field windings 106a–c and 110x are applicable as may be appropriate.

The preferred embodiment of the instant invention combines judicious selection of the relationship between the pole numbers (p vs 2*p*n where p and n are any numbers) combined with an adequate selection of the main stator winding, 106a–c and 110x–z, and rotor winding, 108 and 112, configuration, which leads to a reduction or elimination of harmonic coupling between the low frequency outputs (hereinafter LF) 114a–c and 114n, and high frequency outputs (hereinafter HF) 116x–z of the generator 100. The Table below shows a list of preferred pole combinations:

| Low frequency output (LF) Number of poles (P) | Possible High frequency output (HF) number of poles (2 × P × n) |
|---|---|
| 2 | 4, 8, 12, 16 . . . |
| 4 | 8, 16, 24 . . . |
| 6 | 12, 24 . . . |
| 8 | 16 . . . |
| 10 | 20 . . . |
| 12 | 24 . . . |

In addition and alternate to the preferred pole combinations listed above, the number of poles of the low frequency output and the number of poles of the high frequency output need not be related by the preferred p vs. 2*n*p relationship, however such alternate relationships may suffer from increased interaction between the windings. Such other interactions can be compensated and may not present a problem for specific applications.

The preferred embodiment of the instant invention utilizes a number of poles of 4 for the low frequency windings 106a–c, and a number of poles of 8 for the high frequency windings 110x–z. As used in an electric power generation system, the preferred embodiment further comprises a means 150 for actively controlling the output magnitude of the low frequency windings 106a–c by sensing the output 114a–c and adjusting the excitation of the exciter field 122 to maintain the output magnitude at a predetermined level, regardless of connected load. This means of controlling the output magnitude may be a conventional pulse width modulated (PWM) exciter field control utilizing feedback control, or may be a conventional series voltage regulator controller, or other topology voltage regulator which allows control of the output magnitude by adjusting the excitation level of the exciter field. In the preferred system, the output 116x–z is unregulated. An alternate embodiment comprises a means 151 for actively controlling the output magnitude of the low frequency (LF) windings 106a–c by sensing the output 114a–c and adjusting the excitation of the exciter field 121 to maintain the output magnitude at a predetermined level, regardless of connected load. Additionally, the means 151 actively controls the output magnitude of the high frequency (HF) windings 110x–z by sensing the output 16x–z and adjusting the excitation of the exciter field 123 to maintain the output magnitude at a predetermined level, regardless of connected load.

The main field lamination and winding is designed to create a flux distribution in the airgap that has a fundamental component (p-pole component) and its first even (2*n) harmonic (2*n pole component) of substantially the same magnitude. The p-pole component generates voltage on the low frequency output 114a–c, 114n and the 2*n*p-pole component generates voltage in the high frequency output 116x–z. In the preferred embodiment, a cylindrical rotor configuration with distributed field windings is utilized to generate this complex and unusual flux distribution.

Figure 5:
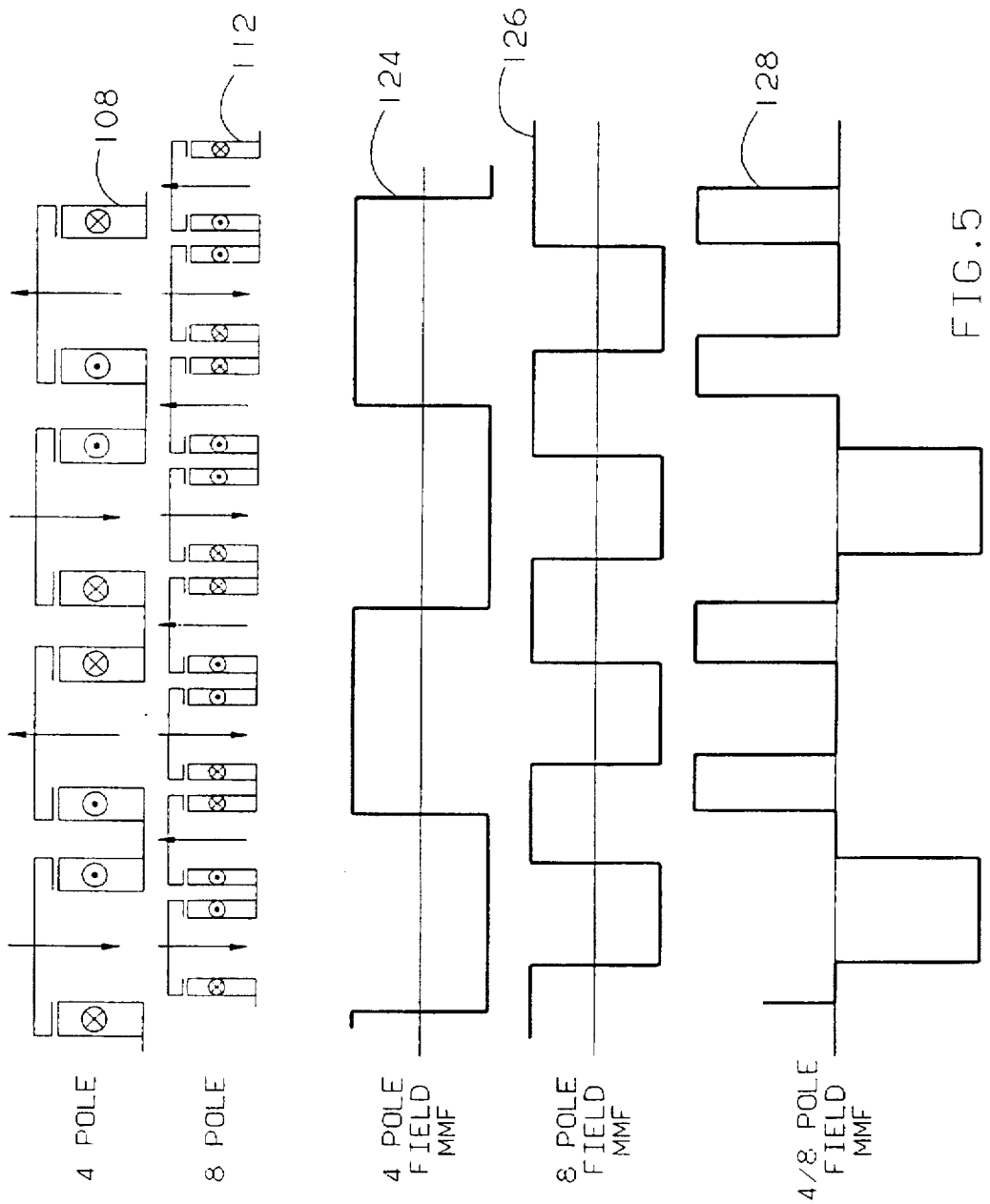
FIG. 5 is a schematic diagram illustrating the dual output/dual frequency generator's main field winding configuration.

This configuration for the preferred embodiment corresponds to the magnetic axis of the 8-pole and 4-pole being aligned as illustrated in FIG. 5, which also illustrates the rotor slots and winding distributions. As can be seen from FIG. 5, the resultant air gap flux can be generated with a cylindrical rotor configuration with no geometric saliency. The flux distribution shows an apparent saliency that is created by the 4-pole MMFs 124 and the 8-pole MMF 126 canceling each other. With a smooth airgap, the resultant flux distribution 128 is similar to a field MMF distribution having its fundamental and second harmonic of substantially the same magnitude.

Assuming a smooth airgap, the inverse of the air-gap length $g^{-1}$ as a function of the mechanical angle $\Psi$ is constant:

$$g^{-1}(\theta_r,\psi)=1/g$$

Where:

$\Psi$ the mechanical angle in the stator reference.

$\theta_r$ angular position of the rotor relative to a stator reference g constant airgap.

Neglecting saturation, the airgap flux density established by the field winding MMF at the space angle $\Psi$ can be resolved into a Fourier series as follows:

$$B_g = \sum_{v=1}^{nh} B_v \cdot \cos\left(\frac{p}{2} \cdot \theta_r - v \cdot \frac{p}{2} \cdot \psi - \phi_v\right)$$

Where:

p is the number of poles of the LF output.

$B_v$ is magnitude of v th harmonic.

The predominant terms of this Fourier series are the fundamental and its second harmonic.

The winding functions of phase a of the LF output ($N_a$) 106a and phase x of the HF output ($N_x$) 110x respectively can be resolved into Fourier series as follows:

$$N_a(\psi) = \sum_{v=1}^{nh} N_{x,v} \cdot \cos\left(v \cdot \frac{p}{2} \cdot \psi - \phi_{a,v}\right)$$

$$N_x(\psi) = \sum_{v=1}^{nh} N_{x,v} \cdot \cos(v \cdot n \cdot p \cdot \psi - \phi_{x,v})$$

Where $N_{a,v}$ and $N_{x,v}$ are proportional to the harmonic winding factors $K_p K_{d,v}$.

The flux linkage in phase a 106a due to the airgap flux density distribution, can be written as follows:

$$\lambda_a = \frac{D_r}{2} \cdot L \cdot \int_0^{2\pi} N_a(\psi) \cdot B_g(\psi) \cdot d\psi$$

Where:

$D_r$ is the armature inside diameter

L is the generator effective stack length

Once finctions $N_a$ and $B_g$ are replaced by their Fourier series and the expression developed, the only remaining terms are the ones with the same pulsation (v.P/2):

$$\lambda_a = \frac{D_r}{2} \cdot L \cdot \sum_{v=1}^{nh} B_v \cdot N_{a,v} \cdot \int_0^{2\pi} \cos\left(v \cdot \frac{p}{2} \cdot \psi - \phi_{a,v}\right) \cdot$$

$$\cos\left(v \cdot \frac{p}{2} \cdot \theta_r - v \cdot \frac{p}{2} \cdot \psi - \phi_v\right) d\psi$$

As can be seen from the above expression, for phase a voltage to be unaffected by the even harmonic fluxes generated by the 2*n*p-pole field winding 112, it is necessary that $N_{a,v}=0$ with v an even harmonic. Therefore, for the LF output 114a–c to be uncoupled from the HF output 116x–z field flux, an integral slot per pole as well as a 60° phase belt winding are required.

On the other hand, the flux linkage in phase x 110x can be written as follows:

$$\lambda_x = \frac{D_r}{2} \cdot L \cdot \int_0^{2\pi} N_x(\psi) \cdot B_g(\psi) \cdot d\psi$$

Or $$\lambda_x = \frac{D_r}{2} \cdot L \cdot \int_0^{2\pi} \sum_{v=1}^{nv} B_v \cdot \cos\left(\frac{p}{2} \cdot \theta_r - v \cdot \frac{p}{2} \cdot \psi - \phi_v\right) \cdot$$

$$\sum_{h=1}^{nh} N_{x,h} \cdot \cos(h \cdot n \cdot p \cdot \psi - \phi_{x,h}) \cdot d\psi$$

Once the above expression is developed, the only remaining terms are the ones that verify the expression:

$$v \cdot p/2 = h \cdot n \cdot p$$

Or $$v = 2 \cdot h \cdot n$$

Therefore, $$\lambda_x = \frac{D_r}{2} \cdot L \cdot \sum_{h=1}^{nh} \int_0^{2\pi} B_{2hn} \cdot N_{x,h} \cdot \cos(h \cdot p \cdot n \cdot \psi - \phi_{x,h}) \cdot$$

$$\cos\left(\frac{p}{2} \cdot \theta_r - h \cdot n \cdot p \cdot \psi - \phi_{2hn}\right) d\psi$$

From the above equation, it can be seen that only the even harmonics generate voltage in the 2xpxn pole windings 110x–z.

When balanced currents are drawn from the armature windings 106a–c and 110x–z, fluxes are generated by the distributed armature MMFs. These armature reaction fluxes interact with the field windings 108 and 112. If a balanced set of sine-wave currents of frequency w is drawn from the LF output 114a–c and a set of balanced currents of frequency 2*n*ω is drawn from the HF output 116x–z, the total armature MMFs are as follows:

$$F_{abc}(\psi) = \sum_{v=1}^{nh} F_{abc,v} \cdot \cos\left(\frac{p}{2} \cdot \theta_r - v \cdot \frac{p}{2} \cdot \psi + \phi_{abc,v}\right)$$

$$F_{xyz}(\psi) = \sum_{\nu=1}^{nh} F_{xyz,\nu} \cdot \cos(n \cdot p \cdot \theta_r - \nu \cdot n \cdot p \cdot \psi + \phi_{xyz,\nu})$$

where $\nu$ is an odd harmonic.

Neglecting magnetic saturation, the airgap flux density waves resulting from the above MMF waves can be found as follows:

$$kB_{abc}(\psi) = \mu_o \cdot g^{-1}(\psi) \cdot F_{abc}(\psi)$$

and $$BK_{xyz}(\psi) = \mu_o \cdot g^{-1}(\psi) \cdot F_{xyz}(\psi)$$

The total flux density at a space angle $\Psi$ is:

$$B(\psi) = B_g(\psi) + B_{abc}(\psi) + B_{xyz}(\psi)$$

The flux linkage in phase $\alpha$ 106a of the LF output due to this airgap flux distribution can be expressed as:

$$\lambda_a = \frac{D_r}{2} \cdot L \cdot \int_0^{2\pi} N_a(\psi) \cdot B(\psi) \cdot d\psi$$

Or when developed:

$$\lambda_a = \frac{D_r}{2} \cdot L \cdot \left[ \int_0^{2\pi} N_a(\psi) \cdot B_g(\psi) \cdot d\psi + \int_0^{2\pi} N_a(\psi) \cdot B_{abc}(\psi) \cdot d\psi + \int_0^{2\pi} N_a(\psi) \cdot B_{xyz}(\psi) \cdot d\psi \right]$$

The flux linkage in phase a 106a due to currents in the HF output phases 110x–z is expressed in the last term of the above expression. This term can be developed as follows:

$$\lambda_{a,xyz} = \int_0^{2\pi} \sum_{\nu=1}^{n\nu} N_{a,\nu} \cdot \cos\left(\nu \cdot \frac{p}{2} \cdot \psi \phi_{a,\nu}\right) \cdot \sum_{\gamma=1}^{n\gamma} F_{xyz,\gamma} \cdot \cos(n \cdot p \cdot \theta_r \gamma \cdot n \cdot p \cdot \psi \phi_{xyz,\gamma}) \cdot d\psi$$

Once the above integral expression is developed, the only remaining terms are the ones that verify the relation:

$$\nu \cdot \vartheta = \gamma \cdot n \cdot p$$

or $$\nu = 2 \cdot n \cdot \vartheta$$

Which is not possible because $\nu$ is an odd harmonic. Therefore, if the generator has an integral slot per pole per phase and the low frequency output winding is 60° phase belt, the above integral is zero. Consequently, no coupling through the airgap flux will take place due to these high frequency output fundamental currents.

If a set of symmetrical harmonic currents of frequency $2*n*\omega*k$ are drawn from the high frequency output 116x–z, the total armature MMF can be expressed as follows:

$$F_{xyz}(\psi) = \sum_{\nu=1}^{nh} F_{xyz,\nu} \cdot \cos(n \cdot p \cdot k \cdot \theta_r - \nu \cdot n \cdot p \cdot \psi + \phi_{xyz,\nu})$$

Neglecting saturation, the airgap flux density wave resulting from the above MMF wave is as follows:

$$B_{xyz}(\psi) = \mu_o \cdot g^{-1}(\psi) \cdot F_{xyz}(\psi)$$

The flux linkage in phase a 106a of the low frequency output can be expressed as follows:

$$\lambda_a = \frac{D_r}{2} \cdot L \cdot \int_0^{2\pi} N_a(\psi) \cdot B(\psi) \cdot d\psi$$

or $$\lambda_a = \frac{D_r}{2} \cdot L \cdot \left[ \int_0^{2\pi} N_a(\psi) \cdot B_g(\psi) \cdot d\psi + \int_0^{2\pi} N_a(\psi) \cdot B_{abc}(\psi) \cdot d\psi + \int_0^{2\pi} N_a(\psi) \cdot B_{xyz}(\psi) \cdot d\psi \right]$$

The flux linkage in a-phase 106a due to the harmonic currents in the high frequency output 116x–z is expressed in the last term of the above expression. This term can be developed as follows:

$$\lambda_{a,xyz} = \int_0^{2\pi} \sum_{\nu=1}^{n\nu} N_{a,\nu} \cdot \cos\left(\nu \cdot \frac{p}{2} \cdot \psi \phi_{a,\nu}\right) \cdot \sum_{\gamma=1}^{n\gamma} F_{xyz,\gamma} \cdot \cos(n \cdot p \cdot k \cdot \theta_r \gamma \cdot n \cdot p \cdot \psi \phi_{xyz,\gamma}) \cdot d\psi$$

As for the fundamental currents, once the above integral expression is developed, the only remaining terms are the ones that verify the relation:

$$\nu = 2 \cdot n \cdot \gamma$$

Which is not possible because $\nu$ is an odd harmonic. Therefore, as for the fundamental, the last integral term is zero. Consequently, no harmonic coupling through the airgap flux takes place due to harmonic current drawn from the high frequency output 116x–z.

Figure 6:
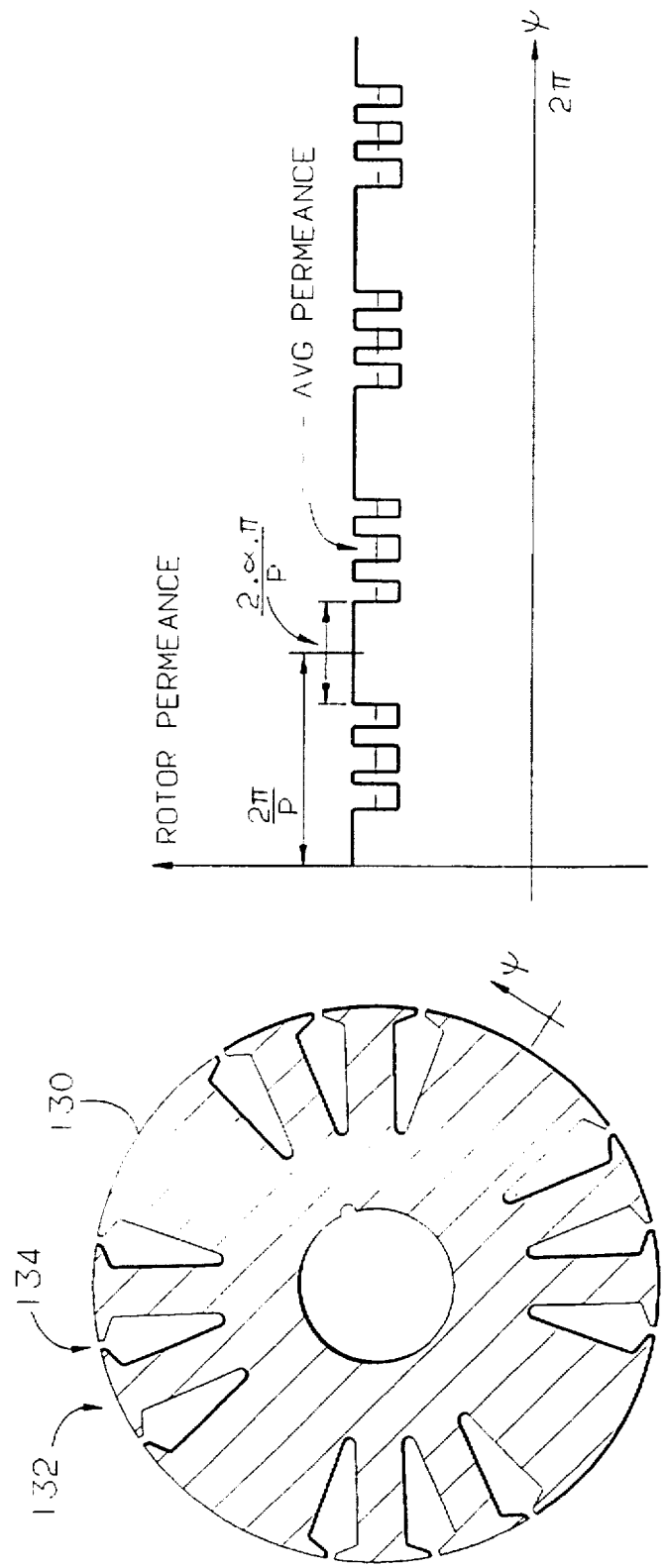
FIG. 6 illustrates the airgap permeance wave introduced by the rotor slot openings of the instant invention.

In the above analysis, a smooth airgap was assumed, which is a good approximation for a cylindrical rotor geometry. In reality, the rotor slot openings will introduce harmonics in the airgap permeance wave that may affect the interaction between the windings under load conditions. Introduction of the airgap permeance variation complicates the theoretical development considerably. Therefore, to present a clearer description of the effect of space harmonics, only the fundamental winding functions combined with a discrete inverse gap function will be considered. With the rotor lamination design 130 of the preferred embodiment (4-pole/8-pole for example) as illustrated in FIG. 6, the inverse gap function is assumed constant at the pole face 132 and having a lower value at the slot opening 134.

The inverse airgap function can be written as follows:

$$g^{-1}(\theta_r, \psi) = \frac{1}{g_o} \quad \theta_r + \frac{\pi}{p} \cdot (2n - \alpha) < \psi < \theta_r + \frac{\pi}{p} \cdot (2n + \alpha)$$

$$g^{-1}(\theta_r, \psi) = \frac{1}{g_a} \quad \theta_r + \frac{\pi}{p} \cdot (2n + \alpha) < \psi < \theta_r + \frac{\pi}{p} \cdot (2n + 2 - \alpha)$$

Where $g_2$ is constant airgap over pole face 132.

$g_z$ is related to the size of the slot opening 134 and rotor slot tip saturation level ($g_2 = g_o$ × Carter Coefficient).

$n = 0, 1, 2 \ldots (p-1)$

The coupling between the two sets of windings 108 and 112 is expressed in the mutual inductance expressed as:

$$L_{a,x} = \mu_o \cdot \frac{Dr}{2} \cdot L \cdot \int_0^{2\pi} g^{-1}(\theta_r, \psi) \cdot N_a(\psi) \cdot N_x(\psi) \, d\psi$$

Taking only the fundamental terms of the winding functions, this expression becomes:

$$L_{a,x} = \mu_o \cdot \frac{Dr}{2} \cdot L \cdot \int_0^{2\pi} g^{-1}(\theta_r, \psi) \cdot N_a \cdot$$

$$\cos\left(\frac{p}{2} \cdot \psi - \phi_a\right) \cdot N_x \cos(n \cdot p \cdot \psi - \phi_x) \, d\psi$$

$$L_{a,x} = \frac{\mu_o \cdot Dr \cdot L \cdot N_a \cdot N_x}{2 \cdot g_o} \cdot$$

$$\sum_{k=0}^{p-1} \int_{\theta_r + \frac{\pi}{p} \cdot (2k - \alpha)}^{\theta_r + \frac{\pi}{p} \cdot (2k + \alpha)} \cos\left(\frac{p}{2} \cdot \psi - \phi_a\right) \cdot$$

$$\cos(n \cdot p \cdot \psi - \phi_x) d\psi + \frac{\mu_o \cdot Dr \cdot L \cdot N_a \cdot N_x}{2 \cdot g_a} \cdot$$

$$\sum_{k=0}^{p-1} \int_{\theta_r + \frac{\pi}{p} \cdot (2k + \alpha)}^{\theta_r + \frac{\pi}{p} \cdot (2k + 2 - \alpha)} \cos\left(\frac{p}{2} \cdot \psi - \phi_a\right) \cdot \cos(n \cdot p \cdot \psi - \phi_x) d\psi$$

Once the above expression is fully developed, the mutual inductance can be written as:

$$L_{a,x} = \frac{\mu_o \cdot D_r \cdot L \cdot N_a \cdot N_x}{2 \cdot g_o \cdot \left(\frac{1}{2} + n\right) \cdot p} \cdot \sin\left(\left(\frac{1}{2} + n\right) \cdot \pi \cdot \alpha\right) \cdot$$

$$\sum_{k=0}^{n-1} \cos\left(\left(\frac{1}{2} + n\right) \cdot p \cdot \left(\theta_r + \frac{\pi}{p} \cdot 2 \cdot k\right) - \phi_a - \phi_x\right) +$$

$$\frac{\mu_o \cdot D_r \cdot L \cdot N_a \cdot N_x}{2 \cdot g_o \cdot \left(n - \frac{1}{2}\right) \cdot p} \cdot \sin\left(\left(n - \frac{1}{2}\right) \cdot \pi \cdot \alpha\right) \cdot$$

$$\sum_{k=0}^{n-1} \cos\left(\left(n - \frac{1}{2}\right) \cdot p \cdot \left(\theta_r + \frac{\pi}{p} \cdot 2 \cdot k\right) + \phi_a - \phi_x\right) +$$

$$\frac{\mu_o \cdot D_r \cdot L \cdot N_a \cdot N_x}{2 \cdot g_s \cdot \left(\frac{1}{2} + n\right) \cdot p} \cdot \sin\left(\left(\frac{1}{2} + n\right) \cdot \pi \cdot (1 - \alpha)\right) \cdot$$

$$\sum_{k=0}^{n-1} \cos\left(\left(\frac{1}{2} + n\right) \cdot p \cdot \left(\theta_r + \frac{\pi}{p} \cdot (2 \cdot k + 1)\right) - \phi_a - \phi_x\right) +$$

-continued $$\frac{\mu_o \cdot D_r \cdot L \cdot N_a \cdot N_x}{2 \cdot g_o \cdot \left(n - \frac{1}{2}\right) \cdot p} \cdot \sin\left(\left(n - \frac{1}{2}\right) \cdot \pi \cdot (1 - \alpha)\right) \cdot$$

$$\sum_{k=0}^{n-1} \cos\left(\left(n - \frac{1}{2}\right) \cdot p \cdot \left(\theta_r + \frac{\pi}{p} \cdot (2 \cdot k + 1)\right) + \phi_c - \phi_x\right)$$

It can be shown, that for any n value (n=1 for 4/8 pole configuration), the cosine sums are all zero. This is due to the fact that the terms:

$$(1 + 2n) \cdot k, (2n - 1) \cdot k, \frac{(2n + 1) \cdot (2k + 1)}{2}, \frac{(2n - 1) \cdot (2k + 1)}{2}$$

are non even numbers. Therefore, rotor slotting will have no effect on the mutual inductance between the two output windings through the modulation of the airgap useful flux by the airgap permeance.

Figure 7:
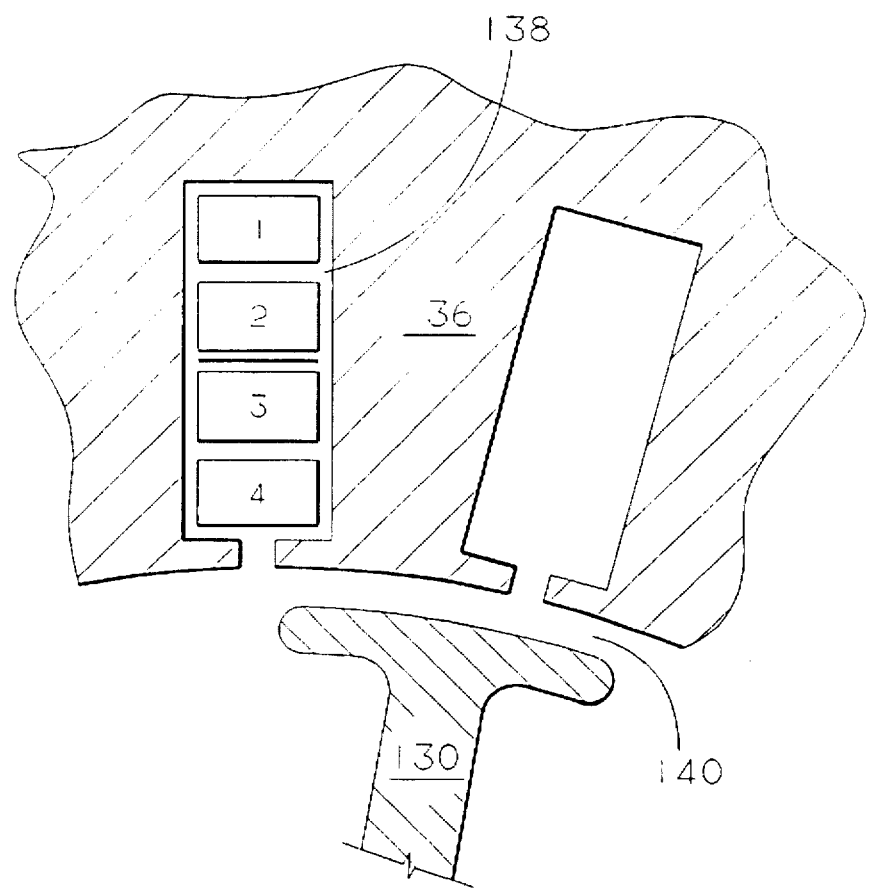
FIG. 7 illustrates the four (4) layer winding configuration of one slot of the instant invention.

The two output windings abc 106a–c and xyz 110x–z share the same slots 138 on the stator 136. One of the windings 110 occupies the top of the slot, the other winding 106 occupies the bottom of the slot as illustrated in FIG. 7. Magnetic coupling can occur when magnetic flux which does not cross the machine airgap 140 couples the two stator windings of different three phase sets. The resultant mutual coupling can be characterized by leakage flux linkage $\lambda_1$ which, for phase a, can be expressed as:

$$\lambda_{1,a} = L_{1,ax} \cdot i_x + L_{1,ay} \cdot i_y + L_{1,az} \cdot i_z$$

Where $L_{1,ax}$, $L_{1,ay}$, $L_{1,az}$ are the mutual leakage inductances between phase a 106a and phases x, y, and z 110x–z respectively.

These three mutual inductances are function of winding configuration and winding pitch. For the two outputs abc 114a–c, and xyz 116x–z to be uncoupled, the leakage flux linkages $\lambda_{1,[a,b,c,x,y,z]}$ must be zero. Assuming a 4 layer winding as illustrated in FIG. 7, with arbitrary phase displacement between the two sets 106 and 110 and different winding pitches, the mutual leakage fluxes may not cancel out. The slot reactance of this 4 layer winding are characterized by 10 individual components as:

$X_1, X_2, X_3, X_4$
$X_{12}/X_{21}$
$X_{13}/X_{31}$
$X_{14}/X_{41}$
$X_{23}/X_{32}$
$X_{24}/X_{42}$
$X_{34}/X_{43}$

Where $X_{n\{1,2,3,4\}}$=Slot leakage reactance due to coil side in position 1, 2, 3 or 4 respectively $X_{mn}$=Mutual slot leakage reactances between layers 1, 2, 3 or 4

Figures 8A, 8B, 8C:
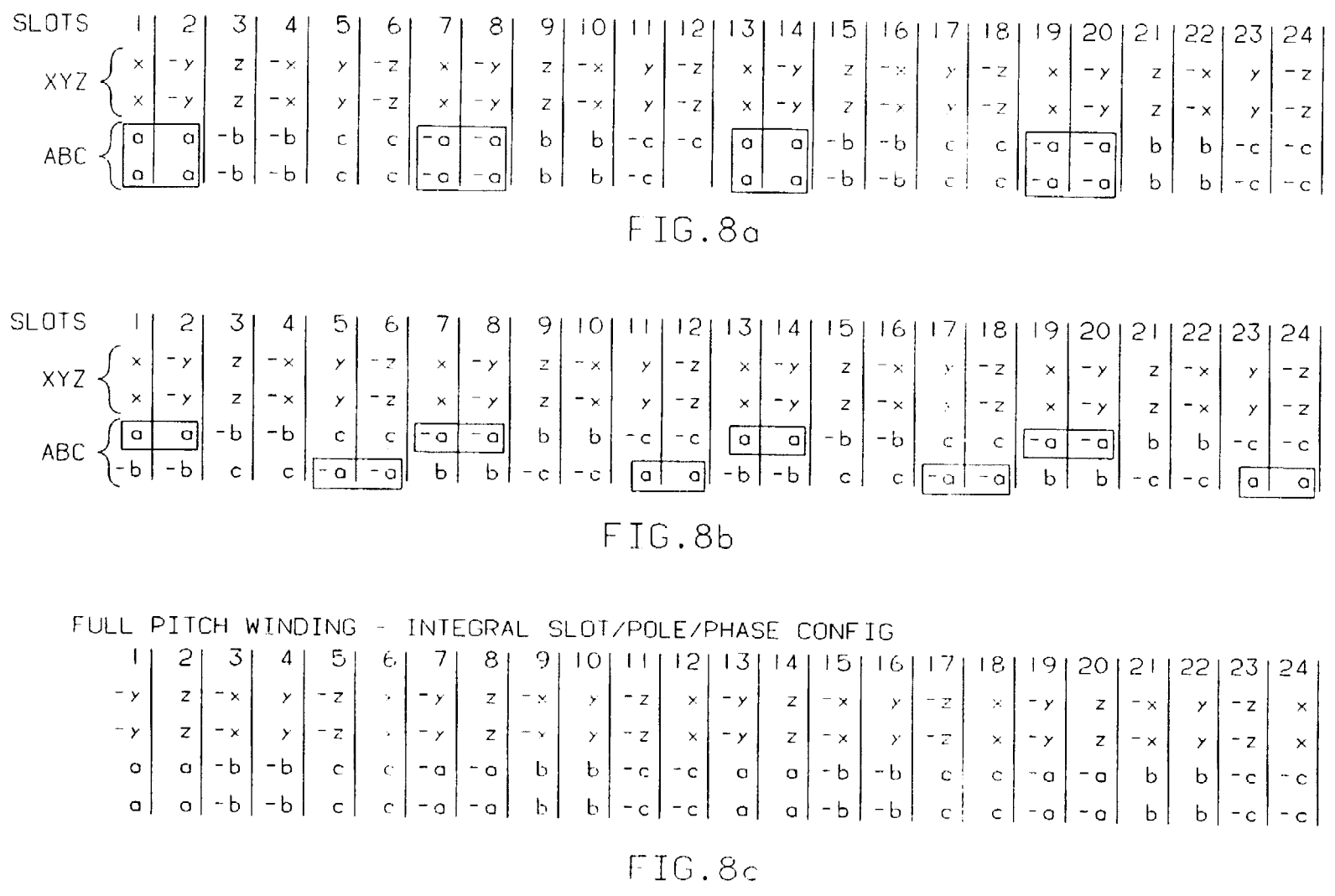

FIG. 8a illustrates a 24 slot armature (1 slot/pole/phase for 8 pole and 2 slots/pole/phase for the 4-pole) utilizing a 60° phase belt full pitch winding distribution. For this armature, the mutual leakage flux linkage in phase a 106a is:

Slots 1/2 & 13/14: $2 \cdot (X_{13}+X_{14}+X_{23}+X_{24}) \cdot i_x \cdot 2 \cdot (X_{13}+X_{14}+X_{23}+X_{24}) \cdot i_y$ Slots 7/8 & 19/20: $-2 \cdot (X_{13}+X_{14}+X_{23}+X_{24}) \cdot i_x + 2 \cdot (X_{13}+X_{14}+X_{23}+X_{24}) \cdot i_y$ The total mutual leakage is the sum of the above two expressions. It is clear, therefore, that the mutual flux linkage in phase a 106a cancels out over 2 pair poles. The same result applies to phases b 106b and c 106c.

If the above abc winding 106 is pitched one slot as illustrated in FIG. 8b, the mutual leakage flux linkage in phase a 106a becomes:
Slots 1/2/23/24 & 11/12/13/14:

$$2.(X_{14}+X_{24}-X_{13}-X_{23}).i_y-2.(X_{14}+X_{24}).i_z+2.(X_{13}+X_{23}).i_x$$

Slots 5/6/7/8 & 17/18/19/20:

$$2.(X_{13}+X_{23}-X_{14}-X_{24}).i_y+2.(X_{14}+X_{24}).i_z=2.(X_{13}+X_{23}).i_x$$

As in the full pitch case, the mutual flux linkage in phase a 106a cancels out. The same result applies to phases b 106b and c 106c.

The same result as above applies if an arbitrary phase shift is introduced between the phase sets as illustrated in FIG. 8c and FIG. 8d.

The 4 pole winding 106 requires that the machine slot number be a multiple of 12 or:

Generator number of slots=k×12 with k=2, 3 ...

The slot/pole/phase (SPP) for the 8 pole winding 110 are then:

$$SPP_{SP}=k\times12/3/8=k/2.$$

Therefore, the allowed SPPs for the 8-pole winding 110 are:

1, 1.5, 2., 2.5 ... or 24,36,48,60,72,84 ... slots

When the same approach as above is applied to the next allowed configuration, 36 slots, the same result is obtained both at full and ⅔ pitches as illustrated in FIG. 8e and FIG. 8f The mutual leakage fluxes seen by phases a, b, c 106a–c cancel out.

The mutual leakage flux linkage taking place within the slot in this 4 layer winding configuration of the preferred embodiment is zero. Consequently, there is no mutual coupling between the two sets of windings 106 and 110 due to the slot related leakage flux. This result can be extrapolated toppole and 2*n*p-pole generator configuration. Additionally, layer winding configurations other than the preferred 4 layer winding configuration may be appropriate in a particular application, the particulars of which are apparent to one skilled in the art from the foregoing.

The non-slot related leakage mutual fluxes including end-turns, zig-zag and belt leakages can be reduced by keeping the stator turns to a minimum, and/ or increase the airgap size. The reduced magnetic coupling between the low frequency and high frequency outputs is valid as long as a symmetry between the poles and coils location is maintained. With any non-symmetrical features such as slot location and airgap, additional harmonics can appear in the winding functions and airgap permeance and some coupling may take place.

The fluxes generating voltages on the two winding sets share the same magnetic circuit. Saturation of the magnetic circuit changes the apparent reluctance of the circuit affecting the magnitudes and shape of the airgap permeance and consequently, the airgap flux distribution. Therefore, change in magnitude and harmonic content of both output voltages can be expected if saturation is present.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A multiple output synchronous generator comprising:
   a stator having a first and a second stator winding, said first and said second stator windings being wound thereon utilizing a pattern such that said first stator winding is magnetically decoupled from said second stator winding preventing interaction therebetween;
   a rotor rotatably disposed within said stator defining an airgap therebetween said rotor having a first and a second field winding wound thereon for generating a flux across said airgap such that said flux induces a voltage in said first and said second stator windings, and
   wherein said first stator winding has a first number of poles and wherein said second stator winding has a second number of poles.

2. The generator of claim 1, wherein said first number of poles is equal to 4 and said second number of poles is equal to 8.

3. The generator of claim 1, wherein said first number of poles is equal to p, where p is any whole number and said second number of poles is equal to 2*p*n, where n is any whole number.

4. A multiple output synchronous generator comprising:
   a stator having a first and a second stator winding, said first and said second stator windings being wound thereon utilizing a pattern such that said first stator winding is magnetically decoupled from said second stator winding preventing interaction therebetween:
   a rotor rotatably disposed within said stator defining an airgap therebetween, said rotor having a first and a second field winding wound thereon for generating a flux across said airgap such that said flux induces a voltage in said first and said second stator windings; and
   wherein said pattern comprises a 60° phase belt winding configuration.

5. A multiple output synchronous generator, comprising:
   a stator having a first and a second stator winding, said first and said second stator windings being wound thereon utilizing a pattern such that said first stator winding is magnetically decoupled from said second stator winding preventing interaction therebetween;
   a rotor rotatably disposed within said stator defining an airgap therebetween, said rotor having a first and a second field winding wound thereon for generating a flux across said airgap such that said flux induces a voltage in said first and said second stator windings; and
   wherein said first field winding has a first number of poles and wherein said second field winding has a second number of poles.

6. The generator of claim 5, wherein said first and said second field windings are configured such that said flux generated in said airgap comprises a findamental component and a first even harmonic component of substantially equal magnitude, said flux additionally comprising odd harmonics and further even harmonics of lesser magnitude.

7. The generator of claim 6, wherein only said fundamental flux component and said odd harmonics of lesser magnitude induce a voltage in said first stator winding.

8. The generator of claim 6, wherein only said even harmonic component and said even harmonics of lesser magnitude induce a voltage in said second stator winding.

9. A multiple output synchronous generator, comprising:

a stator having a first stator winding having a number of poles p and a second stator winding having a number of poles 2*p*n where p and n are any whole numbers, said first and said second stator windings being wound thereon utilizing a 60° phase belt winding configuration such that said first stator winding is magnetically decoupled from said second stator winding preventing interaction therebetween; and a rotor rotatably disposed within said stator defining an airgap therebetween, said rotor having a first field winding having a first number of poles and a second field winding having a second number of poles wound thereon for generating a flux across said airgap such that said flux induces a voltage in said first and said second stator windings, said first and said second field windings being configured such that said flux generated in said airgap comprises a fundamental component and a first even harmonic component of substantially equal magnitude, said flux additionally comprising odd harmonics and further even harmonics of lesser magnitude; and wherein only said fundamental flux component and said odd harmonics of lesser magnitude induce a voltage in said first stator winding; and wherein only said even harmonic component and said even harmonics of lesser magnitude induce a voltage in said second stator winding.

10. An electric power generation system, comprising:

a generator producing a first poly-phase electric output having a first magnitude and a first frequency and a second poly-phase electric output having a second magnitude and a second frequency, said first output being magnetically decoupled from said second output preventing interaction therebetween:

means for actively controlling said first magnitude of said first poly-phase output; and wherein said generator comprises a stator having a first poly-phase stator winding having a first number of poles and a second poly-phase stator winding having a second number of poles, said first and said second stator windings being wound thereon utilizing a pattern such that said first stator winding is magnetically decoupled from said second stator winding preventing interaction therebetween, and a rotor rotatably disposed within said stator defining an airgap therebetween, said rotor having a first and a second field winding wound thereon for generating a flux across said airgap such that said flux induces a voltage in said first and said second stator windings to produce said first and said second poly-phase electric outputs, said first and said second field windings being energized by a single source of electric power.

11. The system of claim 10, wherein said first number of poles is equal to p, and said second number of poles is equal to 2*p*n, where p and n are whole numbers.

12. The system of claim 10, wherein said pattern comprises a 600 phase belt winding configuration.

13. The system of claim 10, wherein said first field winding has a first number of poles and wherein said second field winding has a second number of poles, and wherein said first and said second field windings are configured such that said flux generated in said airgap comprises a fundamental component and a first even harmonic component of substantially equal magnitude, said flux additionally comprising odd harmonics and further even harmonics of lesser magnitude.

14. The system of claim 13, wherein only said fundamental flux component and said odd harmonics of lesser magnitude induce a voltage in said first stator winding, and wherein only said even harmonic component and said even harmonics of lesser magnitude induce a voltage in said second stator winding.

15. An electric power generation system, comprising:

a generator producing a first poly-phase electric output having a first magnitude and a first frequency and a second poly-phase electric output having a second magnitude and a second frequency, said first output being magnetically decoupled from said second output preventing interaction therebetween:

means for actively controlling said first magnitude of said first poly-phase output; and wherein said controlling means senses said first poly-phase electric output and adjusts excitation of said generator in response thereto to maintain said magnitude of said first output at a predetermined magnitude, and wherein said second poly-phase electric output is unregulated.

16. The system of claim 15, wherein said second poly-phase electric output comprises harmonic distortion induced therein by equipment energized thereby, and wherein said first poly-phase electric output is free of said harmonic distortion.

17. An electric power generation system, comprising:

a generator producing a first poly-phase electric output having a first magnitude and a first frequency and a second poly-phase electric output having a second magnitude and a second frequency, said first output being magnetically decoupled from said second output preventing interaction therebetween; and means for separately actively controlling said first magnitude of said first poly-phase output and said second magnitude of said second poly-phase output.

18. An electric power generation system, comprising:

a generator producing a first poly-phase electric output having a first magnitude and a first frequency and a second poly-phase electric output having a second magnitude and a second frequency said first output being magnetically decoupled from said second output preventing interaction therebetween;

means for separately actively controlling said first magnitude of said first poly-phase output and said second magnitude of said second poly-phase output; and wherein said generator comprises a stator having a first poly-phase stator winding having a first number of poles and a second poly-phase stator winding having a second number of poles, said first and said second stator windings being wound thereon utilizing a pattern such that said first stator winding is magnetically decoupled from said second stator winding preventing interaction therebetween, and a rotor rotatably disposed within said stator defining an airgap therebetween, said rotor having a first and a second field winding wound thereon for generating a flux across said airgap such that said flux induces a voltage in said first and said second stator windings to produce said first and said second poly-phase electric outputs, said first and said second field windings being separately energized.

19. The system of claim 18, wherein said first number of poles is equal to p, and said second number of poles is equal to 2*p*n, where p and n are whole numbers.

20. The system of claim 18, wherein said pattern comprises a 60° phase belt winding configuration.

21. The system of claim 18, wherein said first field winding has a first number of poles and wherein said second field winding has a second number of poles, and wherein said first and said second field windings are configured such that said flux generated in said airgap comprises a fundamental component and a first even harmonic component of substantially equal magnitude, said flux additionally comprising odd harmonics and further even harmonics of lesser magnitude.

22. The system of claim 21, wherein only said fundamental flux component and said odd harmonics of lesser magnitude induce a voltage in said first stator winding, and wherein only said even harmonic component and said even harmonics of lesser magnitude induce a voltage in said second stator winding.

23. electric power generation system, comprising:

a generator producing a first poly-phase electric output having a first magnitude and a first frequency and a second poly-phase electric output having a second magnitude and a second frequency, said first output being magnetically decoupled from said second output preventing interaction therebetween;

means for separately actively controlling said first magnitude of said first poly-phase output and said second magnitude of said second poly-phase output; and wherein said controlling means senses said first poly-phase electric output and adjusts excitation of said generator in response thereto to maintain said magnitude of said first output at a predetermined magnitude, and wherein said controlling means senses said second poly-phase electric output and adjusts excitation of said generator in response thereto to maintain said magnitude of said second output at a predetermined magnitude.

24. The system of claim 23, wherein said second poly-phase electric output comprises harmonic distortion induced therein by equipment energized thereby, and wherein said first poly-phase electric output is free of said harmonic distortion.

\* \* \* \* \*